UNITED STATES PATENT OFFICE.

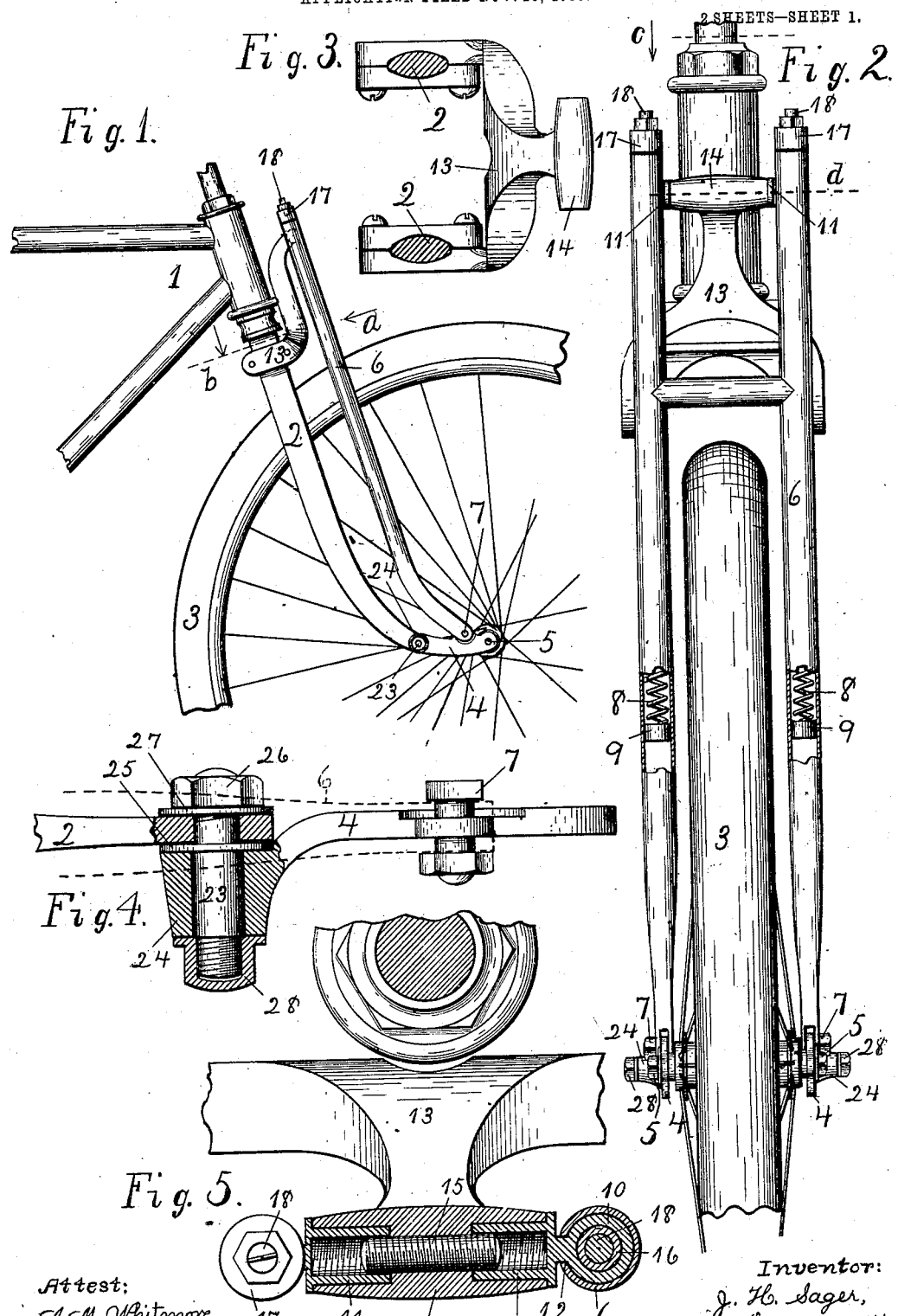

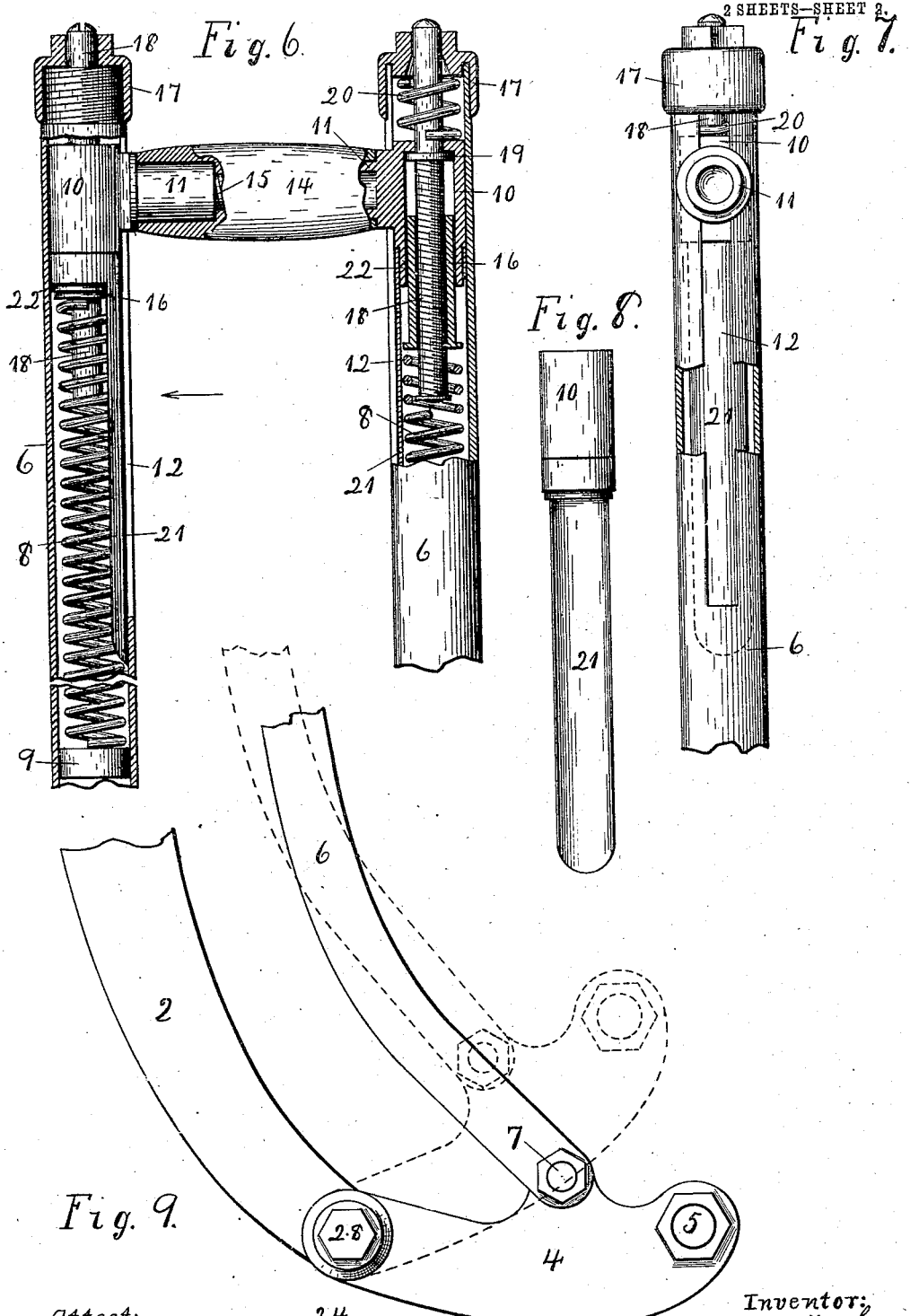

JAMES H. SAGER, OF ROCHESTER, NEW YORK.

BICYCLE ATTACHMENT.

No. 848,324.

Specification of Letters Patent.

Patented March 26, 1907.

Application filed November 10, 1906. Serial No. 342,871.

*To all whom it may concern:*

Be it known that I, JAMES H. SAGER, of Rochester, in the county of Monroe and State of New York, have invented a new and useful Improvement in Bicycle Attachments, which improvement is fully set forth in the following specification and shown in the accompanying drawings.

My invention relates generally to easing-springs for vehicles, it being designed more particularly for use on bicycles and motor-cycles; and it has for its object, among others, to introduce connecting-links between the fork and the axle of the wheel and provide a second fork with tubular branches containing springs connected by pivotal means with the axle of the forward wheel.

Another object of the invention is to provide a part or yoke fixed to the main fork in position to act against the springs in the spring-fork.

Other objects and advantages of the invention will be brought out and made to appear in the following description and the novel features particularly pointed out in the appended claims, reference being had to the accompanying drawings, which, with the reference-numerals marked thereon, form a part of this specification.

Figure 1 is a side elevation of fore parts of a bicycle, showing my invention attached in place thereon, parts being broken away. Fig. 2 is a front view, indicated by arrow *a* in Fig. 1, with parts broken away. Fig. 3 is a plan of the yoke, the fork being in cross-section on the dotted line *b* in Fig. 1. Fig. 4 is an edge view, looking downward, of a connecting-link and adjacent portion of the fork, showing the connection, parts being in horizontal section through the axis of the connecting-bolt. Fig. 5 is a plan of parts indicated by arrow *c* in Fig. 2, the spring-fork and associated parts being horizontally sectioned on the dotted line *d* in said Fig. 2, parts being broken away. Fig. 6 is a front elevation, mainly in longitudinal section, of upper parts of the spring-fork and portion of the yoke, parts being broken away. Fig. 7 is a side elevation of parts at the upper end of one branch of the spring-fork seen as indicated by arrow in Fig. 6, parts being broken away. Fig. 8 is a side elevation of a plunger and dust-guard detached seen in a direction opposite to that of Fig. 7. Fig. 9 is a side elevation of one of the links and lower parts of the two connected forks viewed as in Fig.

1, parts being shown in two positions each by full and by dotted lines. Figs. 4 to 9, inclusive, are drawn to scales larger than those of Figs. 1, 2, and 3.

Referring to the parts shown in the drawings, 1 is a portion of the forward end of the frame of a bicycle, or it may be a motor-cycle, 2, Figs. 1, 3, and 9, being the fork and 3 the front wheel, all substantially of ordinary construction.

4, Figs. 1, 4, and 9, is one of a pair, Fig. 2, of links connecting the lower ends of the branches of the fork by means of pivot-bolts 23 with the axle 5 of the wheel, the fork being disjoined from the axle as in ordinary use and separated therefrom, as shown.

6, Figs. 1, 2, 6, 7, and 9, is an additional fork placed in front of and substantially parallel with the main fork 2 and joined pivotally at its lower end to the links 4, as shown, by pivot-bolts 7 The points of connection of the branches of this fork with the links are between the end bearings of the links and purposely nearer the axle-bearings, as clearly appears in Figs. 1 and 9, this additional or minor fork 6 being independent of the main fork 2.

The branches of the minor fork 6 are cylindrical and tubular, as shown in Figs. 2, 6, and 7, and contain stiff helical or coiled springs 8, resting at their lower ends on suitable base-pieces 9, rigid in the branches. Near their upper ends each branch is provided with a short plunger 10 within, Figs. 6, 7, and 8, adapted to move longitudinally in the branch above the associated spring 8, the branches being open at the top to receive the respective plungers. These plungers are each formed with a branch or part 11, Figs. 2, 5, 6, and 7, projecting at right angles toward each other through longitudinal slots 12 in the opposing sides of the branches of the fork.

In this construction I employ a branched yoke 13, Figs. 1, 2, 3, 5, and 6, secured adjustably to the main fork 2 and reaching upward and forward between the branches of the spring-fork 6, the yoke being formed with a horizontal transverse head 14, with its axis in the plane of the axes of the said branches. The ends of the head 14 are axially cavitied to receive and hold the two cylindrical portions of the branches 11 of the plungers 10, as clearly shown in Figs. 5 and 6, said branches 11 being coaxial and further joined by an axial threaded tie 15. By means of this yoke 13 the weight of the occupant of the vehicle and of the forward part of the frame are brought upon the two plungers 10 and thence upon the springs 8 in the fork 6 and finally upon the pair of link connections 4 4 near the axle 5 of the carrying-wheel 3. This yoke further serves to hold the upper ends of the branches of the fork 6, which two branches are independent of each other and of the main fork 2 and are in no wise secured rigidly to any part of the vehicle, being controlled at their upper ends by the yoke 13 and at their lower ends by the independent links 4.

As clearly shown in Fig. 6, the plungers 10 do not rest directly upon the ends of the springs 8, said plungers being longitudinally chambered to receive within them longitudinally-movable flanged thimbles 16 16, which bear at their lower flanged ends directly upon the springs, as shown. The branches of the fork 6, open at their upper ends, are covered by caps 17, threaded thereon, the branches being further provided with axial adjusting-screws or core-rods 18, Figs. 1, 2, 5, 6, and 7. These adjusting parts are threaded in the respective thimbles 16 and, piercing the cap 17, project slightly thereabove, the exposed ends being transversely slotted to receive an ordinary screw-driver for turning them. These parts 18 are formed with flanges in the cavities of the plungers 10, one being shown at 19, Fig. 6, to resist and control the upward action of the springs, and when turned one way or the other the springs will be compressed or slackened, as the case may be, to support heavy or light riders. In Fig. 6 the thimble at the left is shown drawn up, with the flange against the lower end of the plunger 10, the associated spring 8 being relaxed. At the right the thimble is shown depressed by the screw 18, with its associated spring compressed or in adjustment for a heavy rider. I furthermore insert short spiral buffing-springs in the branches of the fork 6 above the plungers 10, one being shown at 20 in Fig. 6. When the plungers are suddenly or violently thrown upward by the principal springs 8, as sometimes occurs when speeding over rough portions of the road-bed or from the rider suddenly dismounting, these buffing-springs 20, striking the interior portions of the caps 17, catch the rebound of the plungers and prevent injurious shocks. I further provide the piston bodies or plungers 10 with dust-guards 21 21, Figs. 6, 7, and 8, of sheet metal, in positions to cover interiorly the slots 12 in the barrels or branches of the spring-fork 6. These guards are secured to the respective plungers 10, conveniently to reduced parts 22 of said plungers, and move with the latter. The downward movements of the plungers in extreme cases are stopped by the projecting parts of said plungers encountering the portions of the branches at the lower ends of the slots 12. This prevents the upper portion of the main fork 2 from encountering the tire of the wheel 3 during sudden bumpings of the latter when encountering obstacles or from other causes.

The operation, use, and advantages of the invention will now be clearly understood by inspecting Fig. 9. In case the forward wheel of the vehicle strikes an obstacle in the road and is suddenly thrown upward, as indicated by the dotted position, it will correspondingly lift the forward ends of the links 4 and the branches of the spring-fork 6 to positions indicated by dotted lines, and it will be noted that during these movements of the parts the links act with reference to the connected branches of the spring-fork as levers of the second order, the fulcrums being at the pivot-bolts 23. It is further desirable in constructing these parts to thicken the fulcrum ends of the links or levers 4 by forming them with conical projections or parts 24, Figs. 4 and 9, for the purpose of giving the pivot-bolts 23 longer bearings. These bolts are each formed with a flange 25, against which the coacting branch of the main fork 2 is rigidly pressed by an inner screw-nut 26 and intermediate washer 27, the branch of the fork and the pivot-bolt thus acting as a single piece. The bolts turn in the thickened parts 24 of the lever-links 4, a nut 28 of suitable kind being supplied to the outer end of each bolt.

It will be noted that the pivot-joints at 7, Figs. 1 and 9, need not be located with reference to the axle 5 exactly as shown, this being a matter to be determined by experiment and use. It may be found desirable in some constructions to connect the branches of the fork 6 nearer to or directly with the axle 5. This is not essential to the invention, and I do not wish to confine myself to any exact manner or place of connecting the branches of the spring-fork with the links. The links 4 are both alike, but right and left, they being offset in opposite directions at their thick ends, with the bodies of the links substantially in the planes of the associated branches of the main fork joined to them, as clearly appears in Fig. 4.

What I claim as my invention, and desire to secure by Letters Patent, is—

1. A bicycle having, in addition to the fork, a second fork with hollow branches, springs in said hollow branches and means for controlling them, and links connecting the two forks pivotally with the axle of the wheel and with each other.

2. A bicycle having, in addition to the fork, a second fork with hollow branches, springs in said hollow branches and means for controlling them, and links connecting the two forks pivotally with the axle of the wheel and with each other, said spring-carrying fork being independent of the other fork at its upper end, and means for holding it in place on the bicycle.

3. A vehicle, as a bicycle, having a fork and a wheel, and pivotal connectors for said fork and the axle of the wheel, a second fork with hollow branches joined to said connectors, springs in said hollow branches, a plunger in each of the branches adapted to move longitudinally therein, and a member on the first-mentioned fork engaging the plungers to act against the springs.

4. A vehicle, as a bicycle, having a fork and a wheel, independent links connecting the branches of the fork with the wheel, a second fork with slotted tubular branches connected with the links, springs in said hollow branches, plungers in the branches having parts projecting coaxially outward through the slots, and a member adjustable on the said first-mentioned fork joining said projecting parts of the plungers.

5. A vehicle, as a bicycle, having a fork and a wheel, independent links connecting the branches of the fork with the axle of the wheel, a second fork having tubular branches connected with the wheel-axle, springs in said branches, longitudinally-cavitied plungers in the branches above the springs, thimbles in the plungers to press the springs, and means in the branches to longitudinally adjust the thimbles.

6. A vehicle, as a bicycle, having a fork and a wheel, independent links connecting the branches of the fork with the axle of the wheel, a second fork having tubular branches open at the top connected with the wheel-axle, springs in said branches, longitudinally-cavitied plungers in the branches above the springs, thimbles adapted to move longitudinally in the cavities of the plungers to press the springs, adjusting-screws in said tubular branches threaded in the thimbles and projecting out at the upper ends of the branches.

7. A bicycle having two forks one forward of the other connected with each other and with the forward axle by independent links, the branches of the forward fork being tubular and open at the top, springs in the tubular branches, plungers in said hollow branches over the springs and means to move them toward the springs, caps to cover the open ends of the hollow branches, and buffing-springs in the branches between the respective caps and the plungers.

8. A bicycle having two forks connected with each other and with the wheel one fork having tubular branches, springs in said tubular branches, plungers in the branches coacting with the springs and having parts projecting laterally out from the branches and coaxial, an axial connector for said projecting parts, and an element on the other fork joining said projecting parts and controlling the plungers.

9. A bicycle having a fork and a wheel, and connectors for the fork and the axle of the wheel, a second fork with tubular slotted branches joined to said connectors, springs in the branches, plungers in said hollow branches having parts projecting laterally through the slots, a member on said first-mentioned fork to engage said projecting parts of the plungers, and members carried by said plungers within the branches to cover the slots.

10. A vehicle, as a bicycle, having a forward wheel and coacting fork, links connecting the branches of the fork with the axle of the wheel, a second fork connected with said links at its lower end and indirectly connected with the primary fork near its upper end, the links having thickened parts and bolts held rigidly to the branches of said primary fork and adapted to turn in said thick parts of the links, said thickened parts being offset in opposite directions with the body of each link substantially in the plane of the connected branch of the fork.

11. A bicycle having the lower ends of the branches of the fork connected with the axle of the wheel by pivotal links, a pair of tubular members connected to form a second fork with their lower ends pivotally joined to said respective links, plungers adapted to move in said tubular members having cylindrical parts projecting laterally therefrom, a yoke on the primary fork formed with a head between said tubular members and chambered to receive said cylindrical parts, and an axial tie for the cylindrical parts.

12. A bicycle having a secondary fork connected pivotally with the forward axle, carrying-springs in the branches of the secondary fork, plungers in said branches above the springs, and an element on the primary fork to control the plungers, there being short buffing-springs in said branches above the plungers.

In witness whereof I have hereunto set my hand, this 8th day of November, 1906, in the presence of two subscribing witnesses.

JAMES H. SAGER.

Witnesses:
  E. B. WHITMORE,
  A. M. WHITMORE.